Patented Feb. 18, 1941

2,232,636

UNITED STATES PATENT OFFICE 2,232,636

PROCESS FOR THE MANUFACTURE OF UNSATURATED 3-KETO-STEROIDS

Leopold Ruzicka, Zurich, Switzerland, assignor, by mesne assignments, to Ciba Pharmaceutical Products, Incorporated, Summit, N. J., a corporation of New Jersey No Drawing. Application October 14, 1938, Serial No. 235,093. In Switzerland November 1, 1937

9 Claims. (Cl. 260—397)

It is known that 2-halogen-3-ketones of steroids can be converted into the corresponding 1:2-unsaturated ketones by means of agents which cause elimination of hydrogen halide. Thus, for example $\Delta^{1,2}$-androstenol-(17)-one-(3)-acetate is obtained by heating 2-bromandrostanol-(17)-one-(3)-acetate with an alkali salt of an organic acid.

According to this invention 4:5-unsaturated steroid ketones are obtained by subjecting to a thermal decomposition a condensation product of an organic base with a 2-halogen-3-ketone of a steroid. Unexpectedly there occurs a rearrangement which, for example when a halogenpyridinium compound is used as parent material, may be represented by the following scheme:

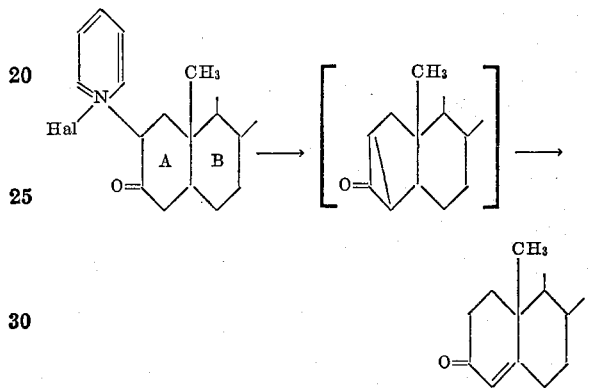

As parent materials there may be used condensation products of any 2-halogen-3-ketosteroids, for example of the series of sterols and bile acids, of the male sexual hormones, of the female sexual hormones (especially of the corpus luteum hormone) and of the hormones of the suprarenal cortex, as well as of the vegetable and animal cardiac poisons. These condensation products may be, for example, organic ammonium compounds which are formed from the halogenketones in question by reaction with tertiary, secondary or primary bases frequently even on standing or by heating for a short while. They may easily be purified but they may also be used in crude condition for the process of the invention.

The thermal decomposition may frequently be conducted with advantage under reduced pressure, the more easily volatile reaction products being advantageously removed continuously from the reaction mixture. The temperature required for producing the decomposition differs from case to case and generally varies between 200° C. and 400° C. It is also possible to conduct the decomposition under pressure, if required in the presence of an inert gas, such as nitrogen or carbon dioxide and/or in presence of a solid or liquid diluent. In the latter case it is advantageous to use a diluent which promotes catalytically the thermal decomposition, that is to say reduces the temperature required for the decomposition. Suitable diluents are, for example, metals, metal oxides and metal salts, for example aluminium oxide, zinc oxide, copper powder and barium chloride. As liquid diluents there come into consideration, for example, hydrocarbons of high boiling point.

The following conversions among others can be produced in accordance with the invention:

Cholestanone-(3)→$\Delta^{4,5}$-Cholestenone-(3),
Androstandione -(3,17)→$\Delta^{4,5}$ - Androstendione - (3:17)
Androstanol-(17)-one-(3)→Testosterone,
Allopregnandione-(3:20)→Progesterone,
3 - keto-allo-cholanic acid→$\Delta^{4,5}$-3 - keto-allo-cholenic acid,
3-keto-aetio-cholanic acid→$\Delta^{4,5}$-3-keto-aetio-cholenic acid.

The following examples illustrate the invention, the parts being by weight:

Example 1

1 part of monobromocholestanone (melting point 170° C.; Butenandt and Wolff, Ber., vol. 67, page 2091 [1935]) and 5 parts of pyridine are heated together in a reflux apparatus for a short time, whereby crystallisation already commences. After cooling the reaction mixture is filtered with suction and the product thus obtained having the composition $C_{32}H_{50}ONBr$ is recrystallized from alcohol. It forms needles which decompose at about 300° C. 1 part of the product thus obtained is distilled in a vacuum at a pressure of 12 millimeters. It distils without first melting and without leaving an appreciable residue. In order to remove pyridine-hydrobromide which has been formed, the distillate is extracted with boiling water. From the portion insoluble in water there is obtained after cooling $\Delta^{4,5}$-cholestenon-(3) which may be purified by the usual methods. It melts at 80° C. and has a rotation $[\alpha]_D = +88°$.

Example 2

1 part of bromandrostane-dione-(3:17) (melting point 214° C.; Butenandt and Dannenberg, Ber., Vol. 69, page 1158 [1936]) is converted in a manner analogous to that indicated in Example 1 into its pyridine addition product which has a decomposition point of about 310° C. 1 part of the product thus obtained is subjected to thermal decomposition under a pressure of 12 millimeters, the reaction product is extracted with boiling water and the product insoluble in water is further purified. There is thus obtained in good yield $\Delta^{4,5}$-androstene-dione-(3:17) of melting point 173–174° C.

Instead of pyridine there may be used, for example, quinoline, dimethylaniline, aniline, amino ethanol or another base.

In a similar manner from bromandrostanol-(17)-one-(3) and their esters there is obtained the known testosterone of melting point 154° C. (corrected) and their esters, and from bromo-allo-pregnane-dione-(3:20) the $\Delta^{4,5}$-progesterone of melting point 128° C.

What I claim is:

1. A process for the manufacture of 4:5-unsaturated 3-keto-steroids, comprising subjecting to thermal decomposition a condensation product of an organic base with a 2-halogen-3-ketone of a steroid.

2. A process for the manufacture of 4:5-unsaturated 3-keto-steroids, comprising subjecting to thermal decomposition a condensation product of an organic base with 2-halogen-3-keto-cyclopentano-10:13-dimethyl-polyhydrophenanthrene containing in 17-position a member of the group consisting of a keto-, a free and an esterfied carbinol group.

3. A process for the manufacture of a 4:5-unsaturated 3-keto-steroid, comprising subjecting to thermal decomposition a condensation product of an organic base with a 2-halogen-3-keto-cyclopentano-10,13 -dimethyl-polyhydrophenanthrene containing in 17-position an acetyl group.

4. The process of preparing progesterone which comprises subjecting to thermal decomposition a condensation product of 2-bromo-allopregnane-dione-3,20 with a tertiary amine base.

5. The intermediate obtained by the reaction of a 2-halogen-3-keto-steroid with an organic base.

6. The intermediate obtained by the reaction of a 2-halogen-3-keto-steroid with a tertiary amine base.

7. The intermediate obtained by the reaction of 2-halo-allopregnanedione-3,20 with a tertiary amine base.

8. The intermediate obtained by the reaction of 2-bromo-allopregnanedione-3,20 with a tertiary amine base.

9. The intermediate obtained by the reaction of 2-bromo-allopregnanedione-3,20 with a tertiary amine base of the group consisting of pyridine, quinoline and N,N-dimethyl aniline.

LEOPOLD RUZICKA.